United States Patent
Alves et al.

(10) Patent No.: US 11,388,271 B2
(45) Date of Patent: *Jul. 12, 2022

(54) ENSURING PROPERLY ORDERED EVENTS IN A DISTRIBUTED COMPUTING ENVIRONMENT

(71) Applicant: Cloudera, Inc., Palo Alto, CA (US)

(72) Inventors: David Alves, Austin, TX (US); Todd Lipcon, San Francisco, CA (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,507

(22) Filed: Oct. 6, 2020

(65) Prior Publication Data

US 2021/0037122 A1 Feb. 4, 2021

Related U.S. Application Data

(63) Continuation of application No. 16/895,947, filed on Jun. 8, 2020, now Pat. No. 11,146,668, which is a (Continued)

(51) Int. Cl.
*G06Q 10/00* (2012.01)
*G06Q 50/26* (2012.01)
(Continued)

(52) U.S. Cl.
CPC ............... *H04L 69/28* (2013.01); *G06F 1/14* (2013.01); *G06Q 10/00* (2013.01); *G06Q 50/26* (2013.01); *H04L 67/10* (2013.01)

(58) Field of Classification Search
CPC ......... H04L 69/28; H04L 67/10; G06Q 50/26; G06Q 10/00; G06F 1/14
See application file for complete search history.

(56) References Cited

U.S. PATENT DOCUMENTS 5,825,877 A 10/1998 Dan et al.
6,078,930 A * 6/2000 Lee ..................... G06F 11/1415
(Continued)

OTHER PUBLICATIONS

Becker, Daniel, Rolf Rabenseifner, Felix Wolf, and John C. Linford. "Scalable timestamp synchronization for event traces of message-passing applications." Parallel Computing 35, No. 12 (2009): 595-607. (Year: 2009).*

(Continued)

*Primary Examiner* — Soe Hlaing
(74) *Attorney, Agent, or Firm* — Perkins Coie LLP

(57) ABSTRACT

A first event occurs at a first computer at a first time, as measured by a local clock. A second event is initiated at a second computer by sending a message that includes the first time. The second event occurs at a second time, as measured by a local clock. Because of clock error, the first time is later than the second time. Based on the first time being later than the second time, an alternate second time, that is based on the first time, is used as the time of the second event. When a third system determines the order of the two events, the first time is obtained from the first computer, and the alternate second time is obtained from the second computer, and the order of the events is determined based on a comparison of the two times.

16 Claims, 4 Drawing Sheets

Related U.S. Application Data continuation of application No. 16/198,677, filed on Nov. 21, 2018, now Pat. No. 10,681,190, which is a continuation of application No. 14/462,445, filed on Aug. 18, 2014, now Pat. No. 10,171,635.

(60) Provisional application No. 61/911,720, filed on Dec. 4, 2013.

(51) Int. Cl.
*H04L 69/28* (2022.01)
*H04L 67/10* (2022.01)
*G06F 1/14* (2006.01)

(56) References Cited

U.S. PATENT DOCUMENTS

| | | |
|---|---|---|
| 6,678,828 B1 | 1/2004 | Pham et al. |
| 6,931,530 B2 | 8/2005 | Pham et al. |
| 7,143,288 B2 | 11/2006 | Pham et al. |
| 8,024,560 B1 | 9/2011 | Alten |
| 8,306,919 B2 | 11/2012 | Sakamura et al. |
| 8,667,267 B1 | 3/2014 | Garcia et al. |
| 8,788,815 B1 | 7/2014 | Garcia et al. |
| 8,821,602 B2 | 9/2014 | McAlister |
| 10,171,635 B2 | 1/2019 | Alves et al. |
| 10,681,190 B2 | 6/2020 | Alves et al. |
| 2002/0073322 A1 | 6/2002 | Park et al. |
| 2003/0200165 A1 | 10/2003 | Nielsen et al. |
| 2004/0093435 A1 | 5/2004 | Purho |
| 2005/0171983 A1 | 8/2005 | Deo et al. |
| 2005/0182749 A1 | 8/2005 | Matsui |
| 2005/0193277 A1 | 9/2005 | Horikawa et al. |
| 2006/0050877 A1 | 3/2006 | Nakamura |
| 2006/0064565 A1* | 3/2006 | Banks ............... G06F 9/546 711/173 |
| 2006/0143453 A1 | 6/2006 | Imamoto et al. |
| 2006/0156018 A1 | 7/2006 | Lauer et al. |
| 2006/0173952 A1* | 8/2006 | Coyle ............... H04L 69/28 709/203 |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0250734 A1 | 10/2007 | Thibadeau |
| 2007/0255943 A1 | 11/2007 | Kern et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0198972 A1 | 8/2010 | Umbehocker |
| 2010/0296652 A1 | 11/2010 | Nakayama et al. |
| 2010/0325713 A1 | 12/2010 | Kurita et al. |
| 2011/0055578 A1 | 3/2011 | Resch |
| 2011/0078549 A1 | 3/2011 | Thueringer et al. |
| 2011/0093866 A1 | 4/2011 | Grabs et al. |
| 2011/0138398 A1 | 6/2011 | Allen |
| 2011/0276495 A1 | 11/2011 | Varadarajan et al. |
| 2011/0302417 A1 | 12/2011 | Whillock et al. |
| 2012/0036357 A1 | 2/2012 | Struik |
| 2012/0130874 A1 | 5/2012 | Mane et al. |
| 2012/0131341 A1 | 5/2012 | Mane et al. |
| 2013/0044658 A1 | 2/2013 | Zhu et al. |
| 2013/0054976 A1 | 2/2013 | Brown et al. |
| 2014/0006458 A1* | 1/2014 | Hsieh ............... G06F 16/2329 707/803 |
| 2014/0149887 A1 | 5/2014 | Bejar et al. |
| 2014/0350888 A1 | 11/2014 | Gesmann |
| 2015/0007204 A1* | 1/2015 | Feig ............... H04N 21/25883 725/10 |
| 2020/0304610 A1 | 9/2020 | Alves et al. |

OTHER PUBLICATIONS

Babaoglu et al., "Consistent global states of distributed systems: Fundamental concepts and mechanism," Distributed Systems, 53 pages, Jan. 1993.

Cheng, Security Attack Safe Mobil and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pages, Aug. 2013.

Du et al., "A Pairwise Key Predistribution Scheme for Wireless Sensor Networks," ACM, May 2005, vol. 8 Issue 2, pp. 228-258.

Kim et al., Design and Implementation of a Private and Public Key Crypto Processor and Its Application to a Security System, IEEE, Feb. 2004, vol. 50, Issue 1, pp. 214-224.

Ko et al., "A Study of Encryption Algorithm for RFID tag (SEED: 8 Roundsx64 bit block)," IEEE, 2008, pp. 672-677.

Lamport, L., "Time, clocks, and the ordering of events in a distributed system," Communications of the ACM, vol. 21, No. 7, pp. 558-565, Jul. 1978.

Non-Final Office Action for U.S. Appl. No. 13/362,695, dated Apr. 29, 2013, 23 pgs.

Stoller, S.D., "Detecting global predicates in distributed systems with clocks," Distributed Computing, vol. 13, No. 2, pp. 85-98, Feb. 2000.

\* cited by examiner

Example execution of the PTSC Clock algorithm

ENSURING PROPERLY ORDERED EVENTS IN A DISTRIBUTED COMPUTING ENVIRONMENT

PRIORITY CLAIM

This application is a continuation application of U.S. patent application Ser. No. 16/895,947, entitled "ENSURING PROPERLY ORDERED EVENTS IN A DISTRIBUTED COMPUTING ENVIRONMENT," filed Jun. 8, 2020, which is a continuation application of U.S. patent application Ser. No. 16/198,677, entitled "ENSURING PROPERLY ORDERED EVENTS IN A DISTRIBUTED COMPUTING ENVIRONMENT," filed on Nov. 21, 2018 (now U.S. Pat. No. 10,681,190), which is a continuation of U.S. patent application Ser. No. 14/462,445, entitled "ENSURING PROPERLY ORDERED EVENTS IN A DISTRIBUTED COMPUTING ENVIRONMENT," filed on Aug. 18, 2014 (now U.S. Pat. No. 10,171,635), which claims to the benefit of U.S. Provisional Patent Application No. 61/911,720, entitled "HYBRIDTIME AND HYBRIDCLOCKS FOR CLOCK UNCERTAINTY REDUCTION IN A DISTRIBUTED COMPUTING ENVIRONMENT", filed on Dec. 4, 2013; all documents are incorporated by reference herein in their entirety.

BACKGROUND

In general, it is difficult to have an accurate measurement of absolute time in a distributed computing environment. Even with time synchronization mechanisms such as Network Time Protocol (NTP, a networking protocol for clock synchronization between networked computer systems), guaranteeing global consistency across distributed computing environments with uncertain physical clocks remains a problem. While synchronizing the clock of each computer in a network to the same reference clock, such as an atomic clock, will reduce the error in times reported by the clocks, it will not eliminate the error. For example, the longer a clock runs without synchronization, the more the clock's time drifts away from the reference clock time, and the larger the error becomes between the two clocks. Even with synchronization, the error is too large to ignore in many cases.

Further, when synchronizing the time, an uncertain network delay exists from the system sending the reference clock time and the system receiving the reference time. A system may send a request for a reference time to a reference system, and may receive a response in 50 milliseconds (ms). The reference time is the time at some point in the 50 ms time window, but it is difficult to know at which point exactly. Some systems will assume that the reference time is the time at the half-way point of the round trip message (i.e. at 25 ms in the example), and will add 25 ms to the reference time to obtain the "current" time. However, this is an approximation with some unknown, albeit bounded (e.g. 50 ms), error. Nonetheless, even with a system such as NTP, any clock of any computer in a distributed computing environment may have some unknown, but generally bounded, error.

BRIEF DESCRIPTION OF THE DRAWINGS

Embodiments of a technique will be described and explained through the use of the accompanying drawings in which.

DETAILED DESCRIPTION

Figure 1:
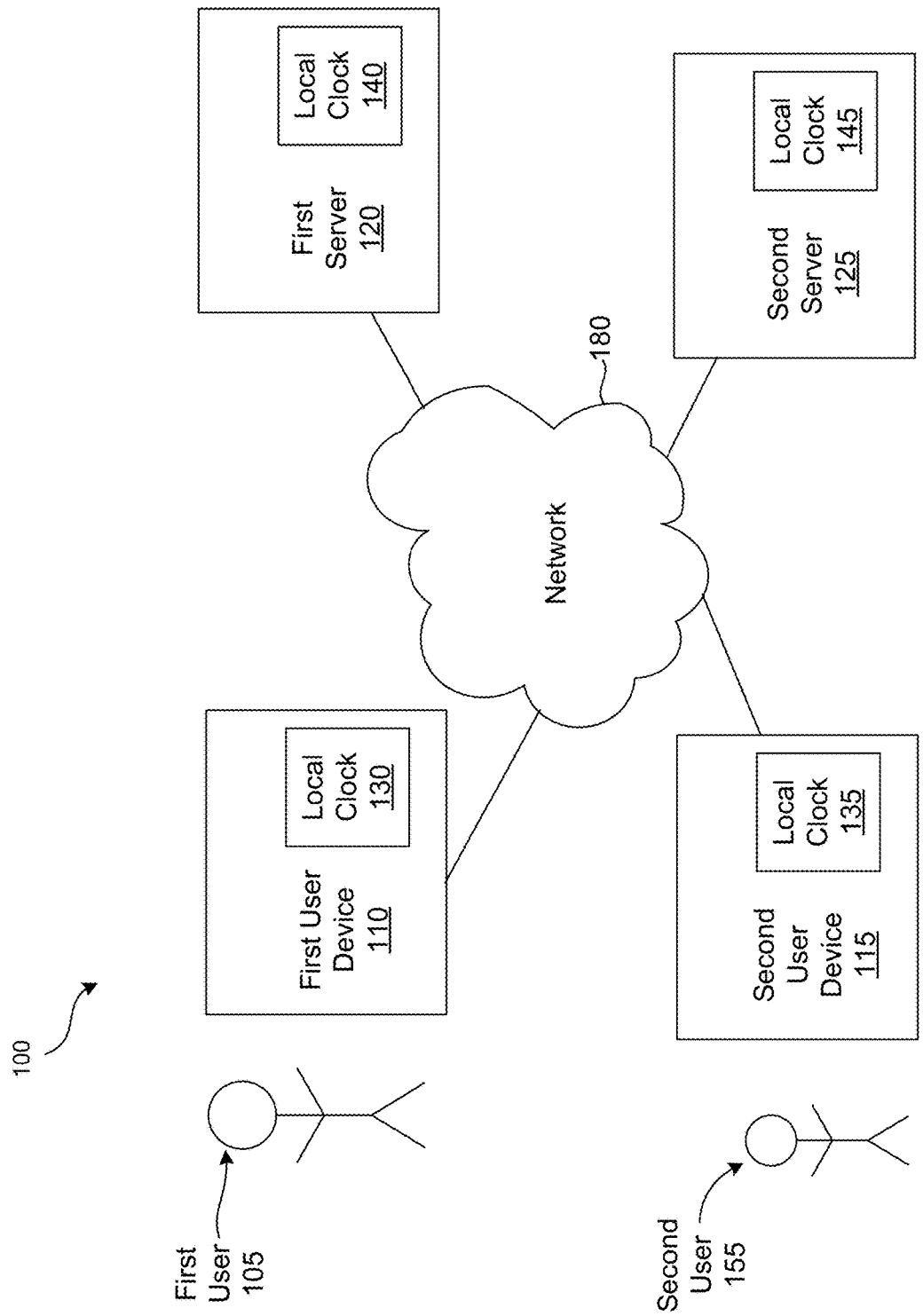
FIG. 1 is a system diagram illustrating a distributed computing environment, consistent with various embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

This description introduces technology for ensuring that events are properly ordered in a distributed computing environment. In one example, a person is an anti-government activist in a foreign country, and the activist uses a social media platform to help promote his anti-government activism. The activist's activities have already created problems for the activist, and he has had to relocate to another country for his safety. To help the activist stay informed as to government activities, the activist "friended" a government official at the social media platform, so that he could see the activities of the government official at the social media platform. At this social media platform, when a first person is a "friend" of a second person, the user account of the first person is linked as a friend via a database (the "friends database (DB)") to the user account of the second person.

The activist is about to post an anti-government message to the social media platform. However, the activist does not want the government official to be able to see the message, so the activist "unfriends" the government agent before posting the anti-government message. At this social media platform, when a first user "unfriends" a second user, the friend link between the first user's account and the second user's account is removed, and each of the two users are no longer able to see any activities of the other user that happen after the unfriending, and that are visible to only friends of the user. Naturally, the activist expects the unfriending to take effect before the posting of the message. He similarly expects that the government official will not be able to see the anti-government message (as the anti-government message has a security setting that limits access to the message to only the activist's friends at the social media platform).

When the activist unfriends the government official, he utilizes his local computer to access the social media platform and execute an unfriend command. This causes an unfriend command to be sent to a remote computer that maintains the friends DB (the "friends DB computer"). The friends DB computer unfriends (i.e. removes the friend link between) the government official's user account and the activist's user account, and updates the friends DB with the time of the unfriending, which is 1:00:00 pm GMT according to the clock of the friends DB computer.

When the activist posts the anti-government message, he wants to post it to a group in his home country. He once again utilizes his local computer to access the social media platform, and he executes a post command to post the anti-government message. This causes a post command to be sent to a remote computer that is located in his home country (the "posting computer"). The posting computer receives the post command, and enters the post in a posts DB, along with a time entry of the post, which happens to be 12:59:59 pm GMT according to the local clock of the posting computer. At the time of the posting, due to inaccuracy/error of the clocks of the friends DB computer and the posting computer, the clock of the friends DB computer is running faster than the clock of the posting computer by a few seconds. As a result, even though the posting happened after the unfriending, according to the local clocks of the friends DB computer and the posting computer, the post incorrectly appears to have happened before the unfriending.

When the government official accesses the social media platform, the platform begins the process of determining what to display for the government official. The social media platform, based on data from the friends DB computer, determines that the government official was friends with the activist until 1:00:00 pm GMT. The platform, based on data from the posting computer, determines that the activist posted the anti-government message at 12:59:59 pm GMT. If the platform had no solution to account for clock error, the platform could erroneously determine that the posting of the anti-government message happened before the unfriending, and could allow the government official to mistakenly view the anti-government message, with possible serious consequences for the activist.

One way to solve this problem is with a "commit wait" solution. As discussed above, while the error between any two clocks of a distributed computing environment may be unknown, it may also be bounded. For example, the error bound between any two clocks may be 5 seconds. In other words, the maximum error between any two clocks of computers of the distributed computing environment is less than 5 seconds. If the activist executes the unfriend command, and then is prevented from executing the post command for a time period greater than the error bound (e.g. 5 seconds), the local time of the post command will be later than the local time of the unfriend command. This is true even when the clock of the computer that executes the post command is running the maximum 5 seconds earlier than the clock of the computer that executes the unfriend command. However, this solution requires every user to wait a time longer than the error bound time between commands where ordering of events matters, which may frustrate many users.

Utilizing the disclosed technology, proper ordering of events, such as the unfriending and the posting of the above example, can be maintained. In one embodiment, as applied to the above example, after the friends DB computer unfriends the government official's user account and the activist's user account, and updates the friends DB with the time of the unfriending, the friends DB computer's response to the activist's local computer includes a message that includes the time of the unfriending (i.e. 1:00:00 pm GMT), and a logical value associated with the unfriending time.

When the activist posts the anti-government message, in addition to sending the anti-government message to the posting computer, the activist via the social media platform also sends the time of and logical value associated with the unfriending, that were received from the friends DB computer. When the posting computer receives the post command and enters the post in the posts DB, instead of automatically updating the friends DB using the time from the clock of the posting computer to indicate the time that the posting occurred, the posting computer does something different. The posting computer compares the unfriending time that was received along with the anti-government message, and the time of the local clock, which happens to be 12:59:59 pm GMT. The comparison determines that the local time is earlier than the unfriending time, so the posting computer updates the posts DB with the unfriending time (i.e. with 1:00:00 pm GMT) as the time that the anti-government message was posted. Additionally, the posting computer increments the logical value associated with unfriending time, and also updates the posts DB with the incremented logical value that is associated with the time of the posting.

Without changing its local clock, the posting computer generates timestamps for new transactions that are the same time or later than received timestamps, such as the received timestamp of the time of the unfriending. If its local clock reads a time earlier than a received timestamp, the posting computer uses the time of the received timestamp as the time for a new event, and increments the logical value that is associated with the time for the new event. The combination of the timestamp and the associated logical value enable unique, incremental values for the timestamps of each event.

When the government official accesses the social media platform, the platform begins the process of determining what to display for the government official. The platform, based on data from the friends DB computer, determines that the government official was friends with the activist until 1:00:00 pm GMT, and also determines the associated unfriending logical value. The platform, based on data from the posting computer, determines that the activist posted the anti-government message at 1:00:00 pm GMT, and also determines the associated posting logical value. After comparing the two times and determining that both are the same time, the posting computer next compares the logical values associated with each of the two times. This comparison determines that the unfriending logical value is lower than the posting logical value, and that therefore the unfriending happened before the posting. Resultantly, the platform determines that the government official was not a friend of the activist at the time of the posting, and that the government official should not be allowed to view the anti-government message.

Turning to the figures, FIG. 1 is a system diagram illustrating a distributed computing environment, consistent with various embodiments. In the example distributed computing environment of FIG. 1, distributed computing environment 100 includes first user device 110 with local clock 130, second user device 115 with local clock 135, first server 120 with local clock 140, and second server 125 with local clock 145, which are all networked together via network 180, which can be or include any of the Internet, a local area network (LAN), a wide area network (WAN), one or more wireless networks (e.g., a WiFi network and/or a cellular telecommunications network), etc. In the example of FIG. 1, first user device 110 is possessed by first user 105, and second user device 115 is possessed by second user 155.

In general, it is difficult for a process in a distributed computing environment, such as distributed computing environment 100, to have an accurate measurement of absolute physical time. Even with time synchronization mechanisms/processes, such as NTP, running on different machines in a distributed computing environment, such as running on devices 110-115 and/or servers 120-125 in distributed computing environment 100, the clocks of the various machines may have some inaccuracy and suffer some error compared to an unknown theoretical reference clock. For example, the times reported by each of clocks 130-145 can have some inaccuracy and error as compared to a theoretical reference clock. Additionally, real-life clocks, such as clocks 130-145, exhibit skew over time: clocks on different machines may drift farther apart from each other as time progresses. This can result in events which occur in a certain order appearing to occur in a different order when the times of the events, which are based on local inaccurate clocks, are compared.

For example, a first event occurs on first server 120, and a second event occurs on second server 125 at a later time. However, because local clock 145 has error and reports a time earlier than local clock 140, local clock 145, when the second event occurs, can report an earlier time than local clock 140 reported when the first event occurred. When the two times are compared, the time of the first event, as reported by local clock 140, can be a later time than the time of the second event, as reported by local clock 145. Resultantly, one could erroneously determine, based on the reported times, that the first event occurred after the second event.

Logical Clocks

One way to address the inaccuracy of physical clocks, such as clocks 130-145, is to employ logical clocks. Logical clocks can ignore any physical clock provided by the system, and can instead create a surrogate notion of logical time in which certain ordering properties are made to hold. In particular, if a process observes (or triggers) one event e, such as the unfriending of the example of the summary, and then triggers a second event f based on the results of e, such as the posting of the anti-government message of the above example, then e is said to have happened before f and the logical timestamp of e must be less than that of f according to some partial order relation.

In order to preserve and/or track any kind of logical happened before relation there is the need to propagate some information along with the messages, be it the form of numeric timestamps, vectors of numeric timestamps, or even matrices of timestamps. Such information can also be relayed to and by third parties in order to preserve correctness. This is often hard if not generally difficult to guarantee.

Though logical clocks can provide for consistent snapshots, such as a snapshot that is consistent across different partitions of a data set, they may lack certain properties which are useful for practitioners; in particular, a system operator or user may wish to perform a "point-in-time" query in a database system, in which the point in time is expressed by a physical timestamp. When the database system is based on logical clocks, there is no physical timestamp nor any absolute time upon which to base the "point-in-time" query.

Though physical clocks such as clocks 130-145 are inaccurate, it is not necessary for a software platform to fully ignore them. Rather, if the inaccuracies present in the physical clock can be modeled and bounded, many of the advantages of physical clocks (e.g. point-in-time query and intuitive ordering between events well-separated in physical time) can be provided while not sacrificing the correct causality tracking provided by logical timestamps.

Overview of Bounded-Error Clocks

In order to measure and bound the error on a physical clock, a model for the error can be developed for the underlying system. The following is one example of such a model:

$$t = t_u \pm \epsilon_u + (1 \pm \lambda)(RTT_s + \Delta t_p) \quad (1)$$

where $t_u$ is the timestamp of the upstream server as of the last synchronization event, $\epsilon_u$ is the error bound on the upstream server, $RTT_s$ is the round-trip time taken to perform the last synchronization, $\lambda$ is a worst-case estimate of the clock rate skew, and $\Delta t_p$ is the amount of time elapsed since the last synchronization event, as measured by the local physical clock. Though the true value of $\lambda$ is unknown and may change over time based on ambient conditions such as temperature, a worst case estimate may be made based on manufacturing tolerances. In some embodiments of a distributed computing environment, such as distributed computing environment 100, a conservative error bound of 200 ppm can hold even for large populations of systems, such as servers 120-125 and/or devices 110-115.

Application Programming Interfaces (APIs) can be made available to software and software platforms that run on devices and systems, such as devices 110-115 and servers 120-125, and which can return the current time including its error bound to the calling program.

Commit Wait

Another way to address the inaccuracy of physical clocks, such as clocks 130-145, is to employ a commit wait system, in which events whose order must be properly maintained are forced to happen at times that are separated by more than the error bound of the clocks. For example, an API can be provided to software programs and/or software platforms that run on systems of a distributed computing environment, such as devices 110-115 and/or servers 120-125 of distributed computing environment 100, and which returns the current time along with an error bound. The software can use this information to implement a system supporting the concept of commit wait. For example, a first event occurs on first server 120, and a second event, whose order must be properly maintained with respect to the first event, is forced to wait an amount of time that is greater than the error bound before being allowed to be executed on second server 125. By waiting a period of time greater than the error bound, the time of the second event, as reported by local clock 145, is reliably after the time of the first event, as reported by the local clock 140, regardless as to which systems of the distributed computing environment the two events occur.

With commit wait, events can be reliably evaluated to determine their proper order, even if two participants communicate via a hidden channel without propagating timestamps, such as by communicating via a communication channel that accesses data of a software platform but is outside of the software platform. Clock propagation happens automatically for communications that happen via communications channels that are within the software platform. In a commit wait system, the ordering of events can be preserved in a way which is consistent with physical time. That is, the time of a first event, as reported by the local clock of the system on which the first event occurs, can be compared to the time of a second event, as reported by the local clock of the system on which the second event occurs, and a comparison of the two times can be reliably relied upon to indicate the correct event order. With a commit wait system, an external message dependent algorithm (such as logical or vector clocks) can be avoided and obtaining the correct order of events can be accomplished by comparing physical times.

Through the use of commit wait, proper ordering of events between any two write transactions can be preserved. In particular, a commit wait system enforces that for any two transactions $T_1$ and $T_2$, where e is the commit event for $T_1$, and f is the start event for $T_2$, if $T_1$ committed before $T_2$ started then PT (e)<PT (f), where PT(x) is the physical time of event x as reported by the local clock of the system at which event x occurred. A commit wait system can produce ordering correctness for causally related transactions, i.e. that any snapshot read will yield a consistent cut, without sending any messages. The relation enforced by a commit wait system can be illustrated by Definition 1.

Definition 1. The happened before relation is defined as:

$$\forall e, f \in S; i, j \in P : e \xrightarrow{TTHB} f \implies PT(e) < Pt(f) \quad (2)$$

A commit wait system can ensure proper event ordering through evaluation of physical time by not releasing a message caused by event e until enough time has passed that all nodes agree that PT (e) is in the past by waiting for $2*\epsilon$ before sending any message resulting from e. Enforcing this relation enables physical times to indicate the proper ordering of events for causally related transactions.

However, such properties come at a price. For one, the transactions are delayed by, for example, $2*\epsilon$, where $\epsilon$ is the error bound of a single clock relative to a theoretical reference clock, and $2*\epsilon$ is the error bound between any two clocks of the distributed computing environment.

Maintaining Event Ordering Using Physical Time

A system based on physical time (the "physical time system", or "PTS") overcomes the above discussed shortcomings of logical clock and commit wait systems. Some embodiments of the physical time system rely on physical time measurement assumptions in order to work. The embodiments further assume that machines, such as devices 110-115 and/or servers 120-125, have a reasonably accurate physical clock (also referred to as a local clock), such as local clocks 130-145. The time reported by physical clocks can be represented by the $PC_i(t)$ function, which outputs the numeric timestamp returned by the physical clock as read by process i at time t, and is able to provide absolute time measurements. This is reasonable to assume since virtually all modern servers are equipped with such a physical clock.

Some embodiments of the physical time system include an underlying physical clock synchronization mechanism that keeps the physical clocks across different servers synchronized with regard to a "reference" time, which can be the time reported by the physical clock of a "reference" server. The "reference" time can be represented by the C(t) function, which outputs the numeric timestamp returned by the "reference" process at time t. Additionally, these embodiments have a clock synchronization mechanism that is able to provide an error bound, or maximum clock error, along with each time measurement. The error bound can be denoted by the $E_i(t)$ function, which outputs the numeric value c error of process i at time $t^1$. The error bound can be the maximum error between any two physical clocks of computers on the distributed computing environment, or between any physical clock of any computer on the distributed computing environment and the "reference" time. The error bound between any two physical clocks can be two times the error bound between any physical clock and the "reference" time.

[1] $E_i(t), C(t), PC_i(t)$ are assumed to use the same time resolution, usually milli- or microseconds.

Because most distributed computing environments execute time synchronization daemons, such as NTP, which both synchronizes the server's clocks and provides a maximum error on the clock error, embodiments of the physical time system that depend on clocks being synchronized can be widely useful. Further, some embodiments of the physical time system make no assumption regarding the actual accuracy of the physical clocks. The physical timestamps returned by server's clocks, such as by local clocks 140-145 of servers 120-125, may have an arbitrarily large, but finite, error, as long as this error's bound is known. The expected relationship between $C(t)$, $PC_i(t)$ and $E_i(t)$ can be the following.

Physical Clock Error is Bound $$\forall i, t: |C(t) - PC_i(t)| \leq E_i(t) \quad (3)$$

That is, the physical time system can assume that the physical timestamp returned by each server's local clock is within $E_i(t) = \epsilon_{i,t}$ of the reference time. Because most clock synchronization mechanisms provide a maximum error with regard to a reference time, the physical time system can be widely useful. It is noteworthy that that $E_i(t)$ can represent different error functions, one per process, and that $\epsilon_{i,t}$ varies from process to process and over time.

The physical time system can further assume that the timestamp returned by the physical clock is monotonically increasing:

Physical Clock Timestamps are Process-Wise Monotonically Increasing $$\forall i, t_1, t_2 : t_1 < t_2 \Rightarrow PC_i(t_1) \leq PC_i(t_2) \quad (4)$$

That is, every time a server's local clock is queried for the current time it never outputs a value that is less than a previous one. For example, every time local clock 140 of first server 120 is queried, it never outputs a value that is less than the previous value. While this assumption is not one hundred percent valid, as the clock synchronism mechanism may skip time forward or backward, such cases are rare and can be easily detected by monitoring the clock synchronization daemon status. Servers may choose to decommission themselves or fail-stop upon detection of such an event. Because most clock synchronization mechanisms adjust clocks by slowing them down or speeding them up over reasonably large periods of time, most physical clocks can be relied upon to output a value that is greater than the previous one.

The physical time system can further assume that the starting point of error intervals is also monotonically increasing process-wise. This is represented as:

The Starting Point for Error Intervals is Process-Wise Monotonically Increasing $$\forall i, t_1, t_2 : t_1 < t_2 \Rightarrow \Rightarrow PC_i(t_1) - E_i(t_1) \leq PC_i(t_2) - E_i(t_2) \quad (5)$$

Most clock synchronization mechanisms support this assumption. When a maximum error bound is calculated at a certain synchronization point, through the swap of messages with a "reference" server, that error bound increases over time until there is a new synchronization point. While the error bound increases in time, the physical time system can rely upon the error bound to not increase in a proportion that is greater than the elapsed time.

Based on these assumptions we can now define a physical time system API that, in some embodiments, can be implemented just using each server's local clock and the NTP protocol.

| Algorithm 1 The Physical Time System API |
|---|
| i ← process_id |
| 1: function Now (p, ε) |
| 2:    p ← PC$_i$(now) |
| 3:    ε ← E$_i$(p) |
| 4:    return (p, ε) |
| 5: end function |
| 6: function NOWINTERVAL(earliest, latest) |
| 7:    p ← PC$_i$(now) |
| 8:    ε ← E$_i$(p) |
| 9:    earliest ← p − ε |
| 10:   latest ← p + ε |
| 11:   return (earliest, latest) |
| 12: end function |

The Physical Time-Stamp Clock

Figure 2:
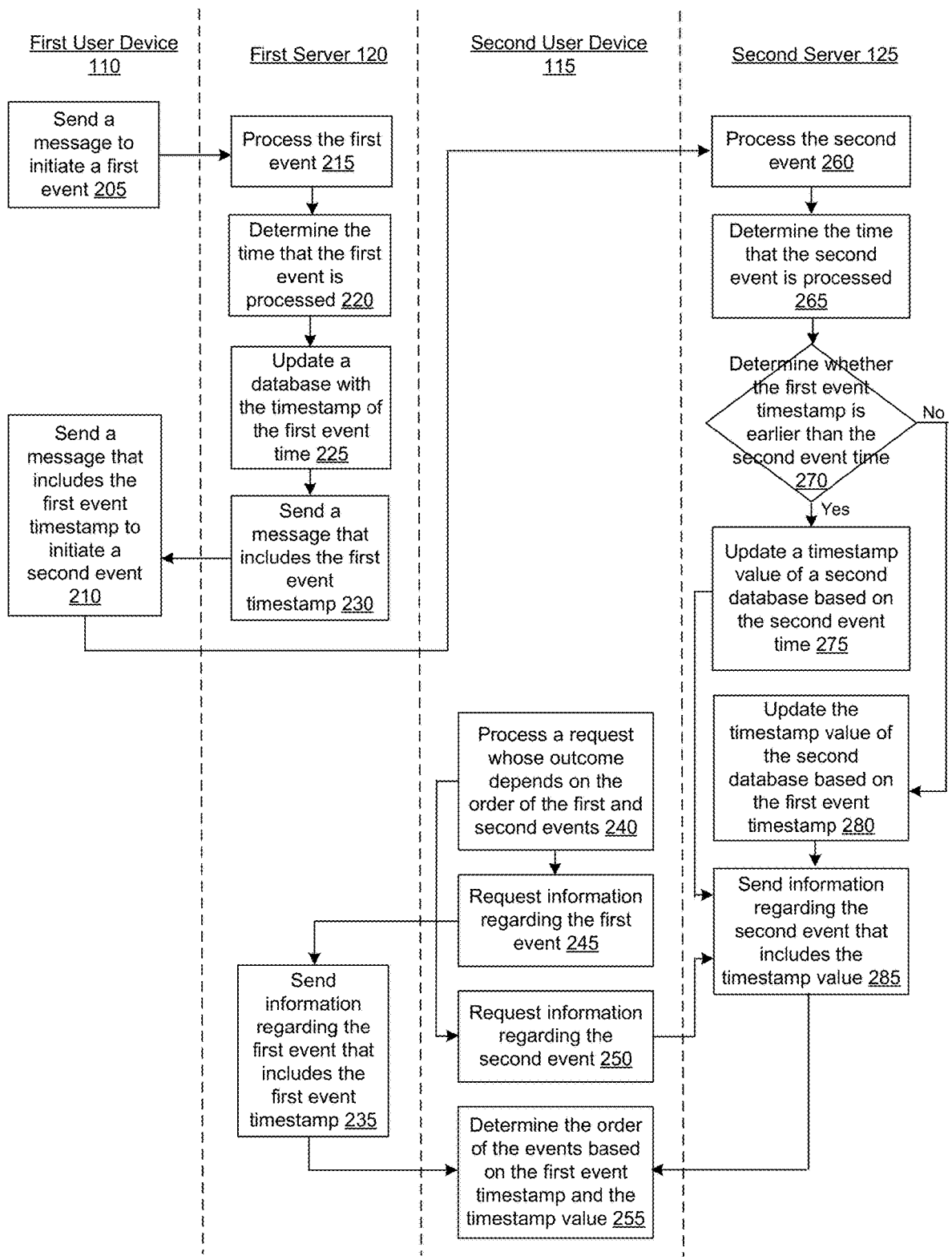
FIG. 2 is an activity diagram illustrating a method for determining the order of events in a distributed computing environment, consistent with various embodiments.

FIG. 2 is an activity diagram illustrating a method for determining the order of events in a distributed computing environment, consistent with various embodiments. The method of the example of FIG. 2 is based on a time-stamp version of a physical time system. The example of the summary will be used to help explain the method illustrated in FIG. 2, which starts with first user device 110 sending a message to initiate a first event to first server 120 (step 205). The first event can be, for example, the unfriending of the example of the summary.

First server 120 processes the first event (step 215) by, e.g., executing the unfriend command. As part of processing the unfriend command, first server 120 updates the friends DB to remove a friend link between an account of first user 105 and an account of second user 155. First server 120 determines the time that the first event is processed (step 220) by, for example, accessing local clock 140 to obtain the time at substantially the same time that the first event is processed. First server 120 updates the friends DB with a timestamp that is based on the time obtained from local clock 140 (step 225), and which represents the time that the first event happened, such as by being processed or executed. First server 120 sends a message that includes the first event timestamp to first user device 110, indicating that the processing of the first event is completed.

In some embodiments, the timestamp, also referred to as a PTS$_{ts}$, is a two-tuple (physical, logical) (or (p, l) for short) where the first component includes a representation of the physical time at which the event occurred, such as the time obtained from local clock 140. The second component is a logical sequence number which indicates an ordering of events whose physical time representations are the same. Algorithm 2 depicts the PTS$_{ts}$ update algorithm.

| Algorithm 2 Time-Stamp Physical Time System update algorithm |
|---|
| 1: var: |
| 2: last:PTSC$_{ts}$ ← |
| 3: pts_api.PTS_API( ) |
| 4: function SEND EVENT(s, snd(u), t) |
| 5:    now ← pts_api.now( ) |
| 6:    u.p ← max(s.last.p, now.p) |
| 7:    u.l ← s.last.l |
| 8:    snd(u) |
| 9:    t.last.p ← u.p |
| 10:   t.last.l ← u.l+1 |
| 11: end function |
| 12: function RECEIVE EVENT(s, rcv(u), t) |
| 13:   now ← pts_api.now( ) |
| 14:   t.last.p ← max(u.ts.p, s.last.p, now.p) |

-continued

Algorithm 2 Time-Stamp Physical Time System update algorithm

```
15:    t.last.1 ← max(u.ts.l, s.last.l)
16:    rcv(u)
17: end function
18: function INTERNAL EVENT(s, internal, t)
19:    now ← pts_api.now( )
20:    t.last.p ← max(s.last, now.p)
21:    t.last.l ← s.last.l + 1
22: end function
```

The notation (s, snd(u), t) denotes a send event that takes the process from state s to state t; (s, internal, t) denotes an internal event; and (s, rcv(u), t) denotes a receive event that was received in state s and was sent from the state u and moves the local process to state t. For example, the processing of the unfriend command at step 215, and the sending of the message that includes the first event timestamp at step 230, moves the local process to a new state, e.g., from a state where first user 105 and second user 155 are friends to a state where first user 105 and second user 155 are not friends.

Each time there is a send event, a $PTS_{ts}$ timestamp can be created and sent along with the message that is sent. The physical component p of this timestamp can be the max( ) of the last received event's timestamp and the current local clock value, whichever is greater. The logical component l of this timestamp can be the current logical sequence number. After the message is sent, the current logical sequence number is increased by one and both the p and l components are saved as the last timestamp.

At step 210, after receiving a message that includes the first event timestamp from first server 120 (step 230), first user device 110 sends a message to second server 125 that includes the first event timestamp to initiate a second event, such as the posting of the anti-government message of the example of the summary. Second server 125 processes the second event (step 260), by, for example, updating the posts DB with the anti-government message. Second server 125 determines the time that the second event is processed (step 265) by, e.g., accessing local clock 145 to obtain the time at substantially the same time that the second event is processed.

Because of clock error, local clocks 140 and 145 may output different times. For ease of explanation, it is assumed that the clocks are off by ten seconds. It is further assumed that local clock 140 of first server 120 has the correct time, and that local clock 145 of second server 125 is reporting a time that is ten seconds earlier than local clock 140. In this hypothetical, step 220, where the first event time is determined, occurs at 1:00:00 pm, and step 265, where the second event time is determined, occurs at 1:00:05 pm, both times with reference to a hypothetical perfect clock. Because local clock 140 has the correct time, the time of the first event, as determined at step 220, will be 1:00:00 pm. However, because local clock 145 is running ten seconds fast, the time of the second event, as determined at step 265, will be 12:59:55 pm, which is ten seconds earlier than the actual time, which is 1:00:05 pm. Even though the first event occurred before the second event, because of the error of the local clocks, the time reported by the local clocks incorrectly indicates that the second event occurred five seconds before the first event.

At step 270, second server 125 determines whether the first event timestamp indicates a time earlier than the second event time by, e.g., comparing the time indicated by the first event timestamp and the time indicated by the second event time, as obtained from local clock 145. With the above assumptions, second server 125 would determine that the first event time is not earlier than the second event time (step 270), and would update a timestamp value of a second database based on the first event timestamp (step 280). The updated timestamp value indicates the time that the second event occurred, and depending on the outcome of step 270, may be based on either the first event timestamp, or the second event time.

In some embodiments, the timestamp value is a two-tuple (p,l), and, in preparation for updating the second database at step 280, p is set to the p of $PTS_{ts}$ (p,l) of the first event timestamp, and l is set to l of $PTS_{ts}$ (p,l) of the first event timestamp, but incremented by one. The two-tuple can be implemented using a single numerical value. For example, the two-tuple can be implemented using a 64 bit number, where the first 52 bits are used for the physical timestamp, and the last 12 bits are used for the logical value. In other embodiments, the time portion of the timestamp value is set to a time later than the time indicated by the first event timestamp, such as a time value that is one unit of time later. When second server 125 determines that the first event time is earlier than the second event time (step 270), second server 125 updates the timestamp value of the second database based on the second event time (step 275) by, e.g., setting the p of the timestamp value two-tuple (p,l) to the second event time. In some embodiments, the l is incremented, while in others, the l is not incremented.

In the hypothetical discussed above where step 220, where the first event time is determined, occurs at 1:00:00 pm, and step 265, where the second event time is determined, occurs at 1:00:05 pm, the p of timestamp value two-tuple (p,l) would be set to 1:00:00 pm. With this hypothetical, at step 270, second server 125 would determine that the p of the first event timestamp (e.g. 1:00:00 pm) is not earlier than the second event time (e.g. 12:59:59 pm). At step 280, the p of timestamp value two-tuple (p,l) would be set to the p of $PTS_{ts}$ (p,l) of first event timestamp, which is 1:00:00 pm. Further, the l of timestamp value two-tuple (p,l) would be set to the l of $PTS_{ts}$ (p,l) of first event timestamp, but incremented by one.

In some embodiments, the timestamp value of steps 275-280 is determined in a different way. For example, second server 125 determines the timestamp value by, e.g., setting the p of the timestamp value two-tuple (p,l) to the max( ) of the last known event's physical timestamp, the arriving message's physical timestamp, and/or the current local clock's timestamp, whichever is greater. The logical component of the reception of the message is taken as the max( ) of the received messages l component an the last local event's l component. Finally whenever there is an internal event, the event's physical component is tagged with the max( ) of the last known event's p component and the current local clock value, whichever is greater.

At step 240, second user device 115 processes a request whose outcome depends on the order of the first and the second events (step 240). Returning to the example of the summary, the request can be the government official attempting to read posts of his social media platform friends. To process the request, second user device 115, or some other system, needs to determine whether the anti-government message was posted before or after the activist unfriended the government official. At step 245, second user device 115 requests information regarding the first event from first server 120, and at step 250, requests information regarding the second event from second server 125. At step 235, first server 120 sends information regarding the first event that includes the first event timestamp to second user device 115. At step 285, second server 125 sends information regarding the second event that includes the timestamp value to second user device 115.

At step 255, second user device 115 determines the order of the events based on the first event timestamp and the timestamp value. User device 115 can determine the order by, for example, comparing the first event timestamp and the timestamp value. In some embodiments, the p of the $PTS_{ts}$ (p,l) of the first event timestamp is compared to the p of the timestamp value two-tuple (p,l). When p of the first event timestamp is earlier than p of the timestamp value, then second user device 115 can determine that the first event occurred before the second event. When p of the first event timestamp is later than p of the timestamp value, then second user device 115 can determine that the second event occurred before the first event. When p of the first event timestamp is equal top of the timestamp value, then second user device 115 compares the l values of the two timestamps. When the l of the first event timestamp is less than the l of the timestamp value, then second user device 115 can determine that the first event occurred before the second event. When the l of the first event timestamp is greater than the l of the timestamp value, then second user device 115 can determine that the first event occurred after the second event.

In the hypothetical discussed above, at step 255 second user device 115 would compare the first event timestamp and the timestamp value to determine the order of the events. First, the p's of the two timestamps would be compared. In this case, both p's are 1:00:00 pm, so the comparison would determine that the two p's are equal. Next, the l's of the two timestamps would be compared. Because the l of the timestamp value was set to the l of the first event timestamp, but incremented by one, the comparison will show that the l of the timestamp value is greater than the l of first event timestamp. Accordingly, second user device 115 would determine that the second event occurred after the first event.

Figure 3:
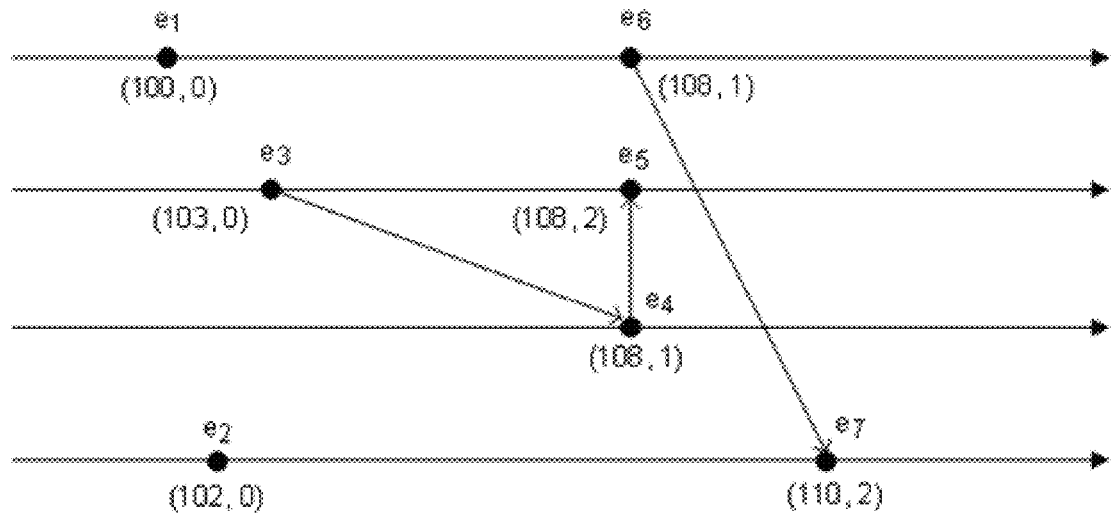
FIG. 3 is a diagram illustrating a sequence of events where some are causally related, consistent with various embodiments.

FIG. 3 is an diagram illustrating a sequence of events where some are causally related, consistent with various embodiments. FIG. 3 depicts the update procedure of some embodiments of the method of FIG. 2 for a sequence of 7 events where $e_3$, $e_4$, and $e_5$ are causally related, and $e_6$ and $e_7$ are causally related.

To order the events timestamped by the PTSC algorithm we use Definition 2. For this definition and throughout this section we use the auxiliary functions phys(e) to denote PTSCts(e).p (e.g., the p of PTSts (p,l)) and lgc(e) to denote PTSCts(e).l (e.g., the l of PTSts (p,l)).

Definition 2. $PTSC_{ts}(e) < PTSC_{ts}(f)$ can be defined as:

$$\begin{cases} lgc(e) < lgc(f) & \text{if } phys(e) = phys(f) \\ phys(e) < phys(f) & \text{otherwise} \end{cases}$$

For the following pairs: $e_1$ and $e_2$, $e_2$ and $e_3$, $e_3$ and $e_4$, and $e_6$ and $e_7$, $phys(e_x) < phys(e_{x+1})$, which means that the first element of the pair occurs before the second element of the pair. For $e_4$, $e_5$, and $e_6$, $phys(e_x) = phys(e_{x+1})$, which means we must consider $lgc(e_x)$ and $lgc(e_{x+1})$. For $e_4$ and $e_5$, $lgc(e_4) < lgc(e_5)$, which means that $e_4$ occurred before $e_5$. While $lgc(e_6) = lgc(e_4)$, this is not an issue as the events are not causally related, so an event order does not need to be determined between these two events. Where events $e_x$ and $e_y$ are causally related, and $phys(e_x) = phys(e_y)$, a comparison of $lgc(e_x)$ and $lgc(e_y)$ can lead to a correct event order.

Figure 4:
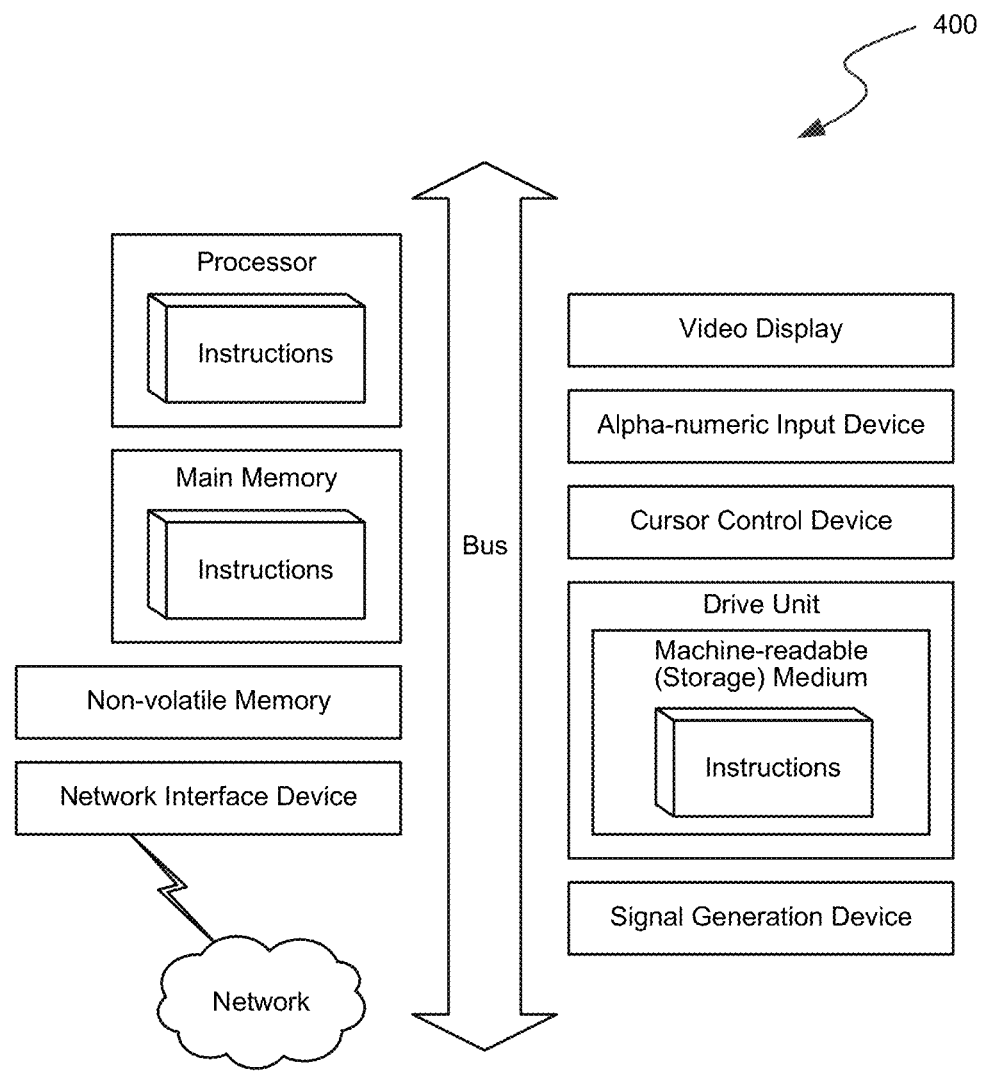
FIG. 4 is a high-level block diagram showing an example of a computer system in which at least some operations described in the descriptions of the above figures can be implemented, consistent with various embodiments.

FIG. 4 is a high-level block diagram showing an example of a computer system 400 that can represent any of the devices described above. In the example of FIG. 4, the computer system 400 includes one or more processors, memory, non-volatile memory, and an interface device. Various common components (e.g., cache memory) are omitted for illustrative simplicity. The computer system 400 is intended to illustrate a hardware device on which any of the components depicted in the example of FIG. 1, such as first user device 110, second user device 115, first server 120, or second server 125, (and any other components described in this specification) can be implemented. The computer system 400 can be of any applicable known or convenient type. The components of the computer system 400 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 4 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, a smartphone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

The invention claimed is:

1. A method for providing global clock consistency across a distributed computing system, the distributed computing system including a plurality of computing machines, the plurality of computing machines including imperfect physical clocks, the method comprising:
    obtaining a first timestamp of a first event, the first timestamp including:
        a physical component indicative of a physical time at which the first event occurred at a first computing machine; and
        a logical component indicative of an ordering of the first event relative to one or more other events; and
    sending a message to initiate a second event to a second computing machine, the message including the first timestamp,
    wherein the message causes the second computing machine to process the second event,
    wherein the first timestamp is usable by the second computing machine to update a second timestamp indicative of when the second event occurred,
    wherein the physical component of the first timestamp is a first physical component based on a first physical clock at the first computing machine of the plurality of computing machines,
    wherein the logical component of the first timestamp is a first logical component, and
    wherein sending the message to initiate the second event causes the second computing machine of the plurality of the plurality of computing machines to:
        process the second event; and
        generate the second timestamp, wherein the second timestamp includes:
            a second physical component indicative of a physical time at which the second event occurred, the second physical component based on a second physical clock at the second computing machine; and
            a second logical component indicative of an ordering of the second event relative to one or more other events.

2. The method of claim 1, wherein the physical component is based on a physical clock associated with one of the plurality of computing machines.

3. The method of claim 1, wherein the ordering of the first event is relative to one or more other events associated with physical time representations indications that are the same as the physical component of the first timestamp of the first event.

4. The method of claim 1, further comprising:
    before sending the message to initiate the second event, sending a message to initiate the first event;
    wherein the first timestamp is obtained in response to sending the message to initiate the first event.

5. The method of claim 1, wherein obtaining the first timestamp includes:
receiving the first timestamp from the first computing machine of the plurality of computing machines;
wherein the first computing machine processed the first event; and
wherein the physical component of the first timestamp is based on a first physical clock at the first computing machine.

6. The method of claim 5,
wherein the second computing machine is one of the plurality of computing machines.

7. The method of claim 1, wherein the second timestamp is generated or updated by the second machine device based on the first timestamp.

8. The method of claim 1, wherein the second logical component is indicative of the ordering of the second event relative to the first event.

9. The method of claim 1, wherein the first event is causally related to the second event.

10. The method of claim 1, further comprising:
determining a correct order of the first event in relation to another event based on a comparison between the first timestamp of the first event and a second timestamp of the other event.

11. The method of claim 1,
wherein the physical component of the first timestamp is a first physical component based on a first physical clock at the first computing machine of the plurality of computing machines;
wherein the logical component of the first timestamp is a first logical component;
the method further comprising:
processing a request whose outcome depends on an ordering of the first event and a third event;
requesting, from one or more of the plurality of computing machines, information regarding the third event;
receiving, in response to the request, the information regarding the third event, the information including a timestamp of the third event, the timestamp including:
a second physical component indicative of a physical time at which the third event occurred, the second physical component based on a second physical clock at the second computing machine of the plurality of computing machines; and
a second logical component indicative of an ordering of the third event relative to one or more other events; and
determining a correct order of the first event in relation to the third event based on a comparison between the first timestamp of the first event and the timestamp of the third event.

12. The method of claim 11, wherein determining the correct order includes:
determining that the first physical component of the first timestamp is equal to the second physical component of the timestamp; and
in response to determining that the first physical component of the first timestamp is equal to the second physical component of the timestamp:
determining the correct order based on a comparison between the first logical component of the first timestamp and the second logical component of the timestamp.

13. The method of claim 1, wherein the first timestamp includes a fixed number of bits, wherein the physical component includes a first subset of the fixed number of bits and where in the logical component includes a second subset of the fixed number of bits.

14. The method of claim 1, wherein each of the plurality of computing machines is configured to attach hybrid timestamps with physical and logical components to events.

15. The method of claim 1, wherein the distributed computing system includes a mechanism for the imperfect physical clocks among the plurality of computing machines to perform synchronization with a reference time, and wherein said mechanism is capable of providing an error bound along with each time measurement against the reference time.

16. A distributed computing system capable of providing global clock consistency, the distributed computing system including a plurality of computing machines, one or more of the computing machines configured to perform operations comprising:
obtaining a first timestamp of a first event, the first timestamp including:
a physical component indicative of a physical time at which the first event occurred at a first computing machine; and
a logical component indicative of an ordering of the first event relative to one or more other events; and
sending a message to initiate a second event to a second computing machine, the message including the first timestamp,
wherein the message causes the second computing machine to process the second event,
wherein the first timestamp is usable by the second computing machine to update a second timestamp indicative of when the second event occurred,
wherein the physical component of the first timestamp is a first physical component based on a first physical clock at the first computing machine of the plurality of computing machines,
wherein the logical component of the first timestamp is a first logical component, and
wherein sending the message to initiate the second event causes the second computing machine of the plurality of the plurality of computing machines to:
process the second event; and
generate the second timestamp, wherein the second timestamp includes:
a second physical component indicative of a physical time at which the second event occurred, the second physical component based on a second physical clock at the second computing machine; and
a second logical component indicative of an ordering of the second event relative to one or more other events.

* * * * *